July 5, 1927.
E. E. CARROLL ET AL
1,634,706
HEATING FURNACE
Filed Oct. 25, 1926     2 Sheets-Sheet 1
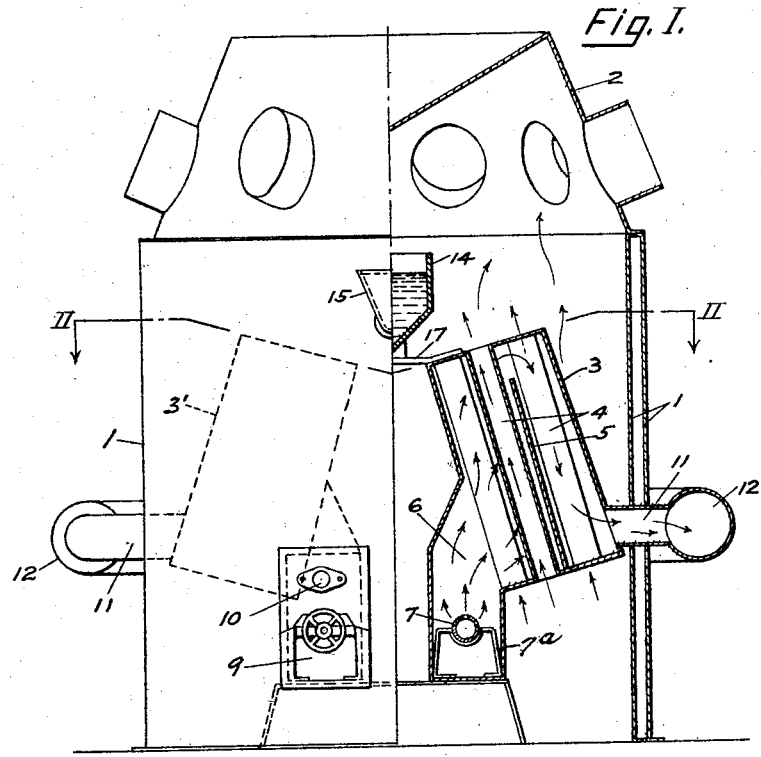
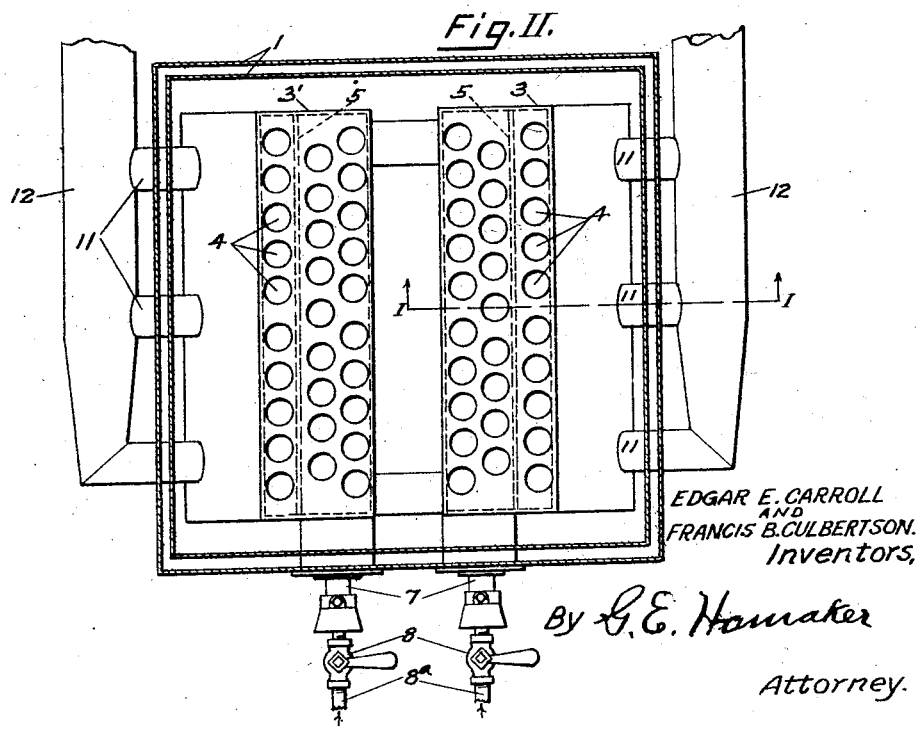
EDGAR E. CARROLL
AND
FRANCIS B. CULBERTSON.
Inventors,
By G. E. Hamaker
Attorney.

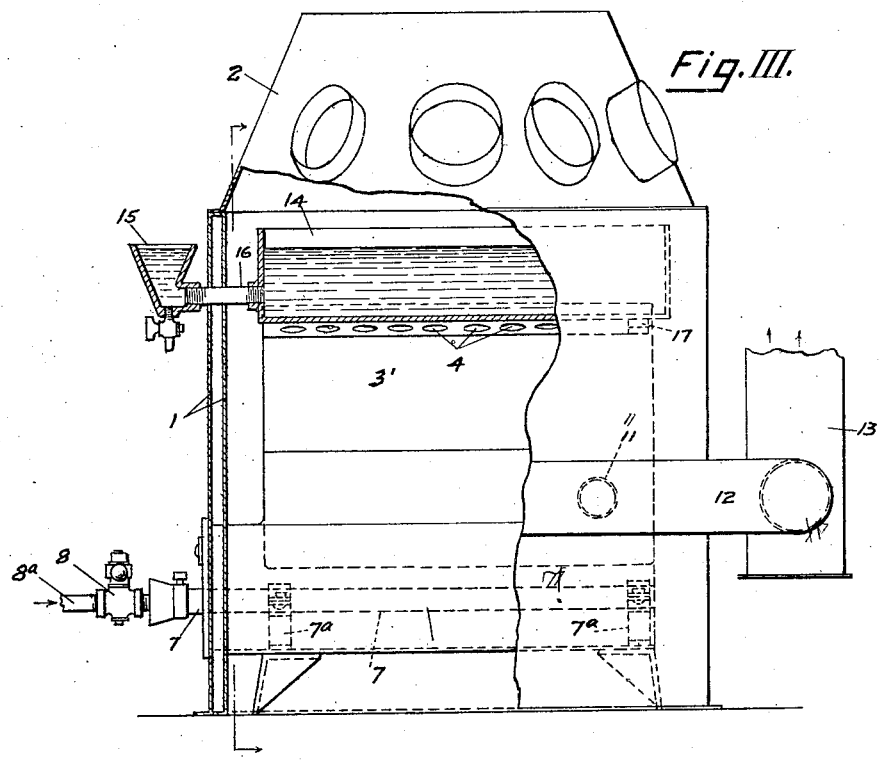
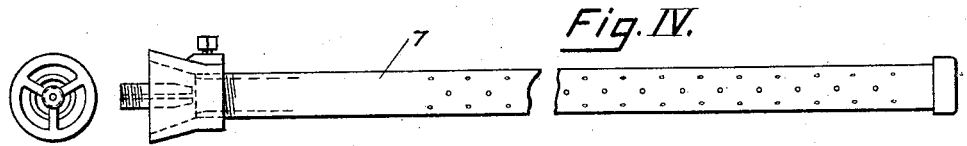
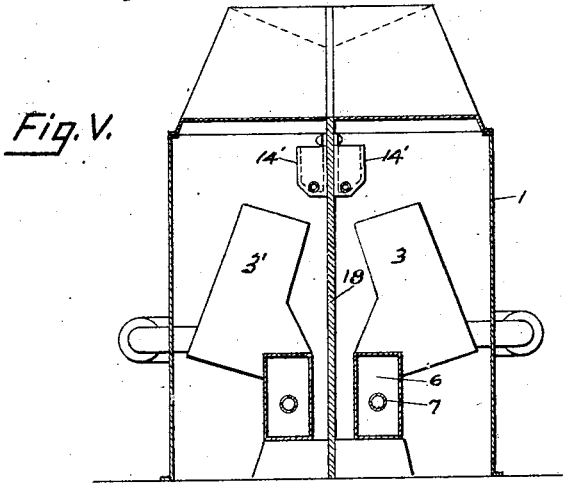

Patented July 5, 1927.

1,634,706

UNITED STATES PATENT OFFICE.

EDGAR E. CARROLL AND FRANCIS B. CULBERTSON, OF PORTLAND, OREGON.

HEATING FURNACE.

Application filed October 25, 1926. Serial No. 144,199.

Our invention relates to heating furnaces of the hot air type and it has for its objects to provide such a furnace with a plurality of separate and distinct heating units located in a suitable casing and jointly (in the preferred embodiment particularly) associated with a vapor pan in such a manner that the heat radiated from the adjacent walls of the respective units as well as the heated air passing through the adjacent air tubes of the respective units will effect a direct heating action on the vapor pan and the consequent vaporization of its contents, the water vapor being taken up by the heated air before the air passes into the hood of the casing for distribution to the air outlets of the furnace.

Another object is to provide a furnace enclosing within its casing two pairs of distinct heating units each consisting of a substantially rectangular box-like body walled on all sides and the top and bottom walls being provided with openings that form the extremities of the air heating tubes located within the bodies and having their ends securely sealed to the top and bottom walls of the box-like bodies and serve as air passes or conduits to convey air from a lower level to a higher level through the heating units; the heating units each also including a burner chamber which constitutes a downward extension from the inner edge of the tube containing chamber and in this burner chamber is located the burner for producing heat; the box-like body portion which contains the air tubes is inclined toward the mid-vertical plane of the furnace to cause the tubes to be likewise inclined and direct the heated air toward the mid-plane of the furnace and upwardly toward the hood, there being a vapor pan located above the heating units in the mid-vertical plane of the furnace to cooperate therewith.

Another object is to increase the outer surface area of the heating units, thereby providing greater radiating surface than has heretofore been found in furnaces of this general type, thus increasing the efficiency of the furnace and reducing the amount of fuel the units consume.

Again it is an object of the invention to provide a furnace in which the vapor pan is so associated with the several heating units that it can readily be taken off should replacement of any of the parts become necessary.

A still further object is to provide a furnace with heating units so designed and constructed as to be gas-tight to prevent the escape of products of combustion into the air space of the furnace, thereby eliminating all danger of asphyxiating the occupants of rooms heated by the furnace and enabling the use of gas or oil burners in an effective, efficient and safe way.

With other objects in view which will be clear to those skilled in the art, the invention resides also in those novel features of construction, combination and arrangement of parts, all of which will be first fully described, then be particularly pointed out in the appended claims, reference being had to the accompanying drawings, in which:—

Figure I is a combined front elevation and central vertical longitudinal section, the section being taken on approximately the line I—I of Figure II.

Figure II is a horizontal section on the line II—II of Figure I.

Figure III is a side elevation with parts broken away.

Figure IV is an enlarged detail side and end elevation of one of the burners.

Figure V is a part section and part elevation of a modified embodiment of the invention, the figure being largely diagrammatic in character.

Similar numerals refer to similar parts throughout the several views.

1 is the casing and attached to 1, at the upper part thereof, is the hood 2. Contained within the casing are the heating units 3 and 3′ and within the heating units 3 and 3′ are three rows of tubes 4, the ends thereof being welded to the surface of the heating units 3 and 3′, and also within the heating units there is attached between the outside and middle row of the tubes 4 a baffle plate 5. This baffle plate 5 is attached to the lower part of the heating unit, leaving a space at the upper part thereof. Just under each of the heating units 3 and 3′ is attached a combustion chamber 6 and at the lower part of combustion chamber 6 is a burner 7. The burner 7 is supported by the brackets 7ª. Attached at the outer end of the burner 7 is the intake valve 8 and leading into the intake valve is the fuel supply pipe 8ª. An air intake 9 is fitted in the casing 1 near the burner 7 and just above the air intake 9 is the peek hole 10. Attached to the heating units 3 and 3' and extending through casing 1 are the vents 11 for the heating units, which lead into the header 12 and the header 12 extends into uptake vent 13. Located above the heating units 3—3' and in proximity to the same is a vapor pan 14 suitably supported at 17 on the tops of the heating units and in alignment with the central vertical longitudinal plane of the furnace. The pan 14 has a bottom of V-shape in cross section to act as a separator and deflector of the warm air currents that ascend between the units 3—3' and also to cause the same to envelope the pan and mingle with the hot air currents rising through the tubes 4 adjacent the pan. A funnel 15 is piped at 16 to the pan 14 and may be used for filling purposes.

It will be observed when this device is constructed of the foregoing parts that the products of combustion from the burner enter into the combustion chamber, travel into the heating unit, come in contact with the baffle plate, circle up and over the baffle plate thereby heating the surface and the tubes in the heating units evenly and uniformly, the fumes and gas passing out into the vents and from there into the uptake vent. The furnace, when thus constructed, is composed of two of said heating units. The heating unit may be heated by means of gas or oil.

In the modified embodiment of our invention illustrated more or less diagrammatically in Figure V of the drawings, the casing of the furnace and the distributing hood are divided by a central vertical longitudinal partition 18 into two half-sections, each half-section containing one heating unit 3—3'. In this embodiment the vapor pan is also divided into two vapor pans 14', which are secured in close relation to the partition, thereby providing a furnace adapted to two-family apartments. The same relation of the vapor pan parts to the respective heating units, however, is maintained as in the embodiment illustrated in Figure I.

It will also be observed that in the furnace constructed as aforesaid the vents provided eliminate the possibility of soot and corrosion.

We are aware that other heating devices have been used but it will be seen from this that this device is new in that the tubes from the heating units are staggered, which breaks up the direct flow of the products of combustion; that in the casing is contained two separate heating units; that each unit is supplied with a combustion chamber and a burner and that the burner is arranged with a plurality of rows of staggered ports, which insures perfect combustion; that the combustion chamber is so arranged that the products of combustion are near the tubes and the chamber is small in size, which brings the products of combustion into direct contact with the tubes.

It will be observed also that the gas or fuel enters the burner from the outside of the furnace so that the gas or fumes are not taken up and circulated with the heat throughout the building heated and in this way the fumes are not circulated throughout the house.

Having fully described our invention we claim and desire to protect by Letters Patent:—

1. In a furnace, a casing having warm air outlets; a plurality of separate and distinct heating units located within the casing, each unit including a box-like structure extending across the furnace from front to back, a plurality of air passing tubes for passing air through the box-like structure and separately from the products of combustion, a burner chamber communicating with said box-like structure at its lowermost place and constituting a part of said heating unit, a burner in said burner chamber, said box-like structure having vents along the bottom edge of its wall that is opposite said burner chamber, said box-like structure and said burner chamber constituting a combustion and heating chamber; collecting headers connecting with the vents of the respective units for carrying off the products of combustion.

2. In a furnace, a casing having a hood with hot air outlets; two separate and distinct heating units located within said casing, each unit comprising an approximately rectangular box-like body extending from front to back of the casing, and including top and bottom walls having openings connected by tubes passing through the bodies thereby constituting air ducts through the body, said bodies being each inclined toward one another whereby the tubes will converge toward the mid-vertical plane of the furnace at the top, each unit also including a burner chamber, the walls of which are attached integrally to said body and with said body constituting a combustion chamber, each unit also including vents for delivering the products of combustion to the outside of the casing; a header for each unit's vents; and a vapor pan located above and between said units to cooperate with both units for the purposes specified.

3. In a furnace, a casing having warm air outlets, heating units within the casing, each unit comprising a box-like body closed on all sides against the escape of products of combustion and having an approximately rectangular portion and a depending burner chamber, a burner in said burner chamber, said depending burner chamber having an inlet for air to support combustion, said approximately rectangular portion having vents to pass the products of combustion to the outside of the casing, air passing tubes located within said approximately rectangular portion and adapted to pass air up through the same from bottom to top to be heated by the products of combustion and the flame from the burner, a partition between groups of tubes to cause up and down movement of the products of combustion in passing through the combustion chamber, said heating units each being inwardly and upwardly inclined toward the central vertical longitudinal plane of the furnace and being spaced apart; a vapor pan held above the tops of said units and in juxtaposition thereto and in alignment with the space between the units for the purposes specified.

4. In a furnace, a casing having warm air outlets, heating units within the casing, each unit comprising a box-like body closed on all sides against the escape of products of combustion and having an approximately rectangular portion and a depending burner chamber, a burner in said burner chamber, said depending burner chamber having an inlet for air to support combustion, said approximately rectangular portion having vents to pass the products of combustion to the outside of the casing, air passing tubes located within said approximately rectangular portion and adapted to pass air up through the same from bottom to top to be heated by the products of combustion and the flame from the burner, a partition between groups of tubes to cause up and down movement of the products of combustion in passing through the combustion chamber, said heating units each being inwardly and upwardly inclined toward the central vertical longitudinal plane of the furnace and being spaced apart; a vapor pan held above the tops of said units and in juxtaposition thereto and in alignment with the space between the units; a partition separating said casing into two chambers, one heating unit being located in each chamber.

5. A furnace comprising a casing having a hood with hot air outlets; a pair of separate and distinct heating units; and means for mounting said units in the casing; each said unit comprising a box-like body enclosing an approximately rectangular tube containing chamber and a burner chamber forming a downward extension from one corner edge of said tube containing chamber, said burner chamber being upright and said tube containing chamber being inclined with respect to the burner chamber, air passing tubes in said containing chamber, said tube containing chamber having vents for discharging the products of combustion to the outside of the casing; said means for mounting comprising a support on the floor of the furnace on which said burner chambers are set and openings in said casing in which said vents are set; and headers connecting the vents of the units outside of the furnace to convey the products of combustion to an uptake vent.

6. A furnace comprising a casing having a hood with hot air outlets; a pair of separate and distinct heating units; and means for mounting said units in the casing, each said unit comprising a box-like body enclosing an approximately rectangular tube-containing chamber and a burner chamber forming a downward extension from one corner edge of said tube containing chamber, said burner chamber being upright and said tube containing chamber being inclined with respect to the burner chamber, air passing tubes in said tube containing chamber, said tube containing chamber having vents for discharging the products of combustion to the outside of the casing; said means for mounting comprising a support on the floor of the furnace on which said burner chambers are set and openings in said casing in which said vents are set; and headers connecting the vents of the units outside of the furnace to convey the products of combustion to an uptake vent; a vapor pan common to both units and including a support resting on the tops of the units, said units being spaced apart and said pan being set in vertical alignment with the space between said units, said tubes being set to converge upwardly toward said pan substantially as specified.

7. A furnace comprising a casing having a hood with hot air outlets; a pair of separate and distinct heating units; and means for mounting said units in the casing; each said unit comprising a box-like body enclosing an approximately rectangular tube-containing chamber and a burner chamber forming a downward extension from one corner edge of said tube containing chamber, said burner chamber being upright and said tube containing chamber being inclined with respect to the burner chamber, air passing tubes in said tube containing chamber, said tube containing chamber having vents for discharging the products of combustion to the outside of the casing; said means for mounting comprising a support on the floor of the furnace on which said burner chambers are set and openings in said casing in which said vents are set; and headers connecting the vents of the units outside of the furnace to convey the products of combustion to an uptake vent; a vapor pan common to both units, said pan including a V-shaped bottom, a support for said pan resting on the tops of said units, said units being spaced apart and said pan being set in vertical alignment with a space between said units, the adjacent row of tubes of each unit being set to converge upwardly toward the vapor pan substantially as shown and described.

8. In a hot air furnace having a casing, the combination of two separate and distinct heating units spaced apart, and a common vapor pan associated with said units within the casing; said units including warm air passing tubes, the tubes of the units being inclined upwardly toward the central vertical plane of the furnace between the units, said vapor pan being supported within the casing above the heating units and in vertical alignment with the space between said units and in position to be engaged by the ascending air from the space between said units and from the adjacent tubes of the respective units, said units also including separate heating burners, and vents to pass the products of combustion out of the furnace.

9. In a furnace, the combination of a casing and two separate and distinct heating units located within the casing; each unit comprising a box-like body with walls on all sides, three rows of staggered tubes within said body and opening through the top and bottom thereof to constitute air passes through that body, that portion of each of said bodies having the tubes being inclined toward the mid-vertical longitudinal plane of the furnace, said bodies each, at their outer sides, having a series of vents extending through the sides of the casing to the outside thereof; and headers located along the sides of the casing into which said vents deliver products of combustion.

10. In a furnace, the combination of a casing and two separate and distinct heating units located within the casing; each unit comprising a box-like body with walls on all sides, three rows of staggered tubes within said body and opening through the top and bottom thereof to constitute air passes through that body, that portion of each of said bodies having the tubes being inclined toward the mid-vertical longitudinal plane of the furnace, said bodies each, at their outer sides, having a series of vents extending through the sides of the casing to the outside thereof; and headers located along the sides of the casing into which said vents deliver products of combustion; said bodies at their inner sides having depending burner chambers, the same being in communication with the interior of the respective tube containing chambers of the bodies, burners located in the burner chambers, and baffle-partitions between the outermost rows of tubes in each body for the purpose specified.

In witness whereof, we have hereunto set our hands this 19th day of October, 1925.

E. E. CARROLL.
F. B. CULBERTSON.